US009601942B2

(12) United States Patent
Bae

(10) Patent No.: US 9,601,942 B2
(45) Date of Patent: Mar. 21, 2017

(54) WIRELESS POWER RECEIVER AND WIRELESS POWER TRANSFERRING METHOD

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/963,993

(22) Filed: Dec. 9, 2015

(65) Prior Publication Data

US 2016/0126780 A1     May 5, 2016

Related U.S. Application Data

(63) Continuation of application No. 13/803,938, filed on Mar. 14, 2013, now Pat. No. 9,246,400.

(30) Foreign Application Priority Data

Mar. 19, 2012    (KR) ........................ 10-2012-0027978

(51) Int. Cl.
*H01F 38/14*     (2006.01)
*H02J 7/02*     (2016.01)
(Continued)

(52) U.S. Cl.
CPC ............... *H02J 7/025* (2013.01); *H02J 5/005* (2013.01); *H02J 7/04* (2013.01); *H02J 17/00* (2013.01); *H02M 7/02* (2013.01)

(58) Field of Classification Search
CPC ............ H02J 5/005; H02J 7/025; H01F 38/14
See application file for complete search history.

(56) References Cited

U.S. PATENT DOCUMENTS 5,428,521 A    6/1995   Kigawa et al.
5,675,491 A * 10/1997   Kijima .................... H01F 30/10
                                                          323/223
(Continued)

FOREIGN PATENT DOCUMENTS

CN     10-1938151 A    1/2011
CN     10-2113195 A    6/2011
(Continued)

OTHER PUBLICATIONS

Office Action dated Jul. 26, 2013 in Korean Application No. 10-2012-0027978, filed Mar. 19, 2012.
(Continued)

*Primary Examiner* — Rexford Barnie
*Assistant Examiner* — Terrence Willoughby
(74) *Attorney, Agent, or Firm* — Saliwanchik, Lloyd & Eisenchenk

(57) ABSTRACT

Disclosed is a wireless power receiver to transfer power wirelessly received from a wireless power transmitter to a load. The wireless power receiver includes a first reception induction coil coupled with a reception resonant coil to receive AC power; a first rectifying diode to rectify the AC power received through the first reception induction coil; a second reception induction coil connected to the first reception induction coil and coupled with the reception resonant coil to receive the AC power; and a second rectifying diode to rectify the AC power received through the second reception induction coil, wherein the wireless power receiver changes a transferring path of the power provided to the load according to a polarity variation of the AC power received through the first and second reception induction coils.

11 Claims, 6 Drawing Sheets

(51) Int. Cl.
*H02M 7/02* (2006.01)
*H02J 17/00* (2006.01)
*H02J 5/00* (2016.01)
*H02J 7/04* (2006.01)

(56) References Cited

U.S. PATENT DOCUMENTS

| | | |
|---|---|---|
| 5,923,544 A | 7/1999 | Urano |
| 6,108,216 A | 8/2000 | Abe et al. |
| 6,504,732 B2 | 1/2003 | Abe |
| 8,908,400 B2 | 12/2014 | Lisi et al. |
| 2009/0184950 A1 | 7/2009 | Furuta et al. |
| 2010/0253665 A1 | 10/2010 | Choi |
| 2010/0327804 A1 | 12/2010 | Takahashi et al. |
| 2011/0248574 A1 | 10/2011 | Yamamoto et al. |
| 2012/0262004 A1 | 10/2012 | Cook et al. |

FOREIGN PATENT DOCUMENTS

| | | |
|---|---|---|
| EP | 2328252 A2 | 6/2011 |
| JP | 2008-099352 A | 4/2008 |
| KR | 10-2011-0112776 A | 10/2011 |
| WO | WO-02/37641 A1 | 5/2002 |

OTHER PUBLICATIONS

Office Action dated Jan. 25, 2013 in Korean Application No. 10-2012-0027978, filed Mar. 19, 2012.
European Search Report dated Jul. 15, 2013 in European Application No. 13159584.5.
Office Action, dated Sep. 2, 2014 in Chinese Application No. 201310087522.5.

\* cited by examiner

WIRELESS POWER RECEIVER AND WIRELESS POWER TRANSFERRING METHOD

CROSS-REFERENCE TO RELATED APPLICATION

This application is a continuation of U.S. application Ser. No. 13/803,938, filed Mar. 14, 2013, which claims the benefit under 35 U.S.C. §119 of Korean Patent Application No. 10-2012-0027978, filed Mar. 19, 2012, which is hereby incorporated by reference in its entirety.

BACKGROUND

The disclosure relates to a wireless power transmission technology. In more particular, the disclosure relates to a wireless power receiver and a wireless power transferring method capable of maximizing the power transmission efficiency by using resonance.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmitting technologies, an energy transmitting scheme employing resonance has been widely used.

In a wireless power transmission system employing resonance, since an electrical signal generated between the wireless power transmitter and the wireless power receiver is wirelessly transferred through coils, a user may easily charge electronic appliances such as a portable device.

However, according to the related art, there is a limitation to reduce the power loss caused while AC power is converted into DC power in the wireless power receiver that receives power using resonance.

BRIEF SUMMARY

The disclosure provides a method capable of maximizing the efficiency of the power transmission by using resonance in a wireless power transmission technology.

The disclosure provides a method capable of improving rectifying efficiency by reducing the power loss caused while AC power is converted into DC power in a wireless power receiver that receives power using resonance.

The disclosure provides a method capable of reducing the cost and the size of a circuit by reducing a number of rectifying diodes that convert AC power into DC power in a wireless power receiver that receives power using resonance.

According to one embodiment, there is provided a wireless power receiver to transfer power wirelessly received from a wireless power transmitter to a load. The wireless power receiver includes a first reception induction coil coupled with a reception resonant coil to receive AC power; a first rectifying diode to rectify the AC power received through the first reception induction coil; a second reception induction coil connected to the first reception induction coil and coupled with the reception resonant coil to receive the AC power; and a second rectifying diode to rectify the AC power received through the second reception induction coil, wherein the wireless power receiver changes a transferring path of the power provided to the load according to a polarity variation of the AC power received through the first and second reception induction coils, wherein either the first rectifying diode or the second rectifying diode rectify the AC power according to the polarity variation of the AC power, and wherein the first rectifying diode is turned on to transfer the power to the load when a polarity of the AC power is positive, and the second rectifying diode is turned on to transfer the power to the load when the polarity of the AC power is negative.

The wireless power receiver transfers the power to the load through a first loop and a second loop. The first loop is a power transferring path extending through the first reception induction coil, the first rectifying diode and the load, and the second loop is a power transferring path extending through the second reception induction coil, the second rectifying diode and the load.

One terminal of the first reception induction coil is connected to one terminal of the second reception induction coil.

The first and second reception induction coils are wound in a same direction.

The first rectifying diode includes a first anode connected to an opposite terminal of the first reception induction coil and a first cathode connected to the one terminal of the load, the second rectifying diode includes a second cathode connected to the first cathode and a second anode connected to an opposite terminal of the second reception induction coil, the one terminal of the first reception induction coil and the one terminal of the second reception induction coil are connected to an opposite terminal of the load, and the opposite terminal of the load is grounded.

The embodiments have the following effects.

First, the efficiency of the power transmission between a transmission side and a reception side can be maximized by using resonance.

Second, the rectifying efficiency can be improved through the configuration of a reception side which can reduce a power loss caused while AC power is converted into DC power.

Third, a number of rectifying diodes for converting AC power into DC power can be reduced, so that the cost can be reduced and the entire size of a circuit can be reduced.

Meanwhile, any other various effects will be directly and implicitly described below in the description of the embodiment.

DETAILED DESCRIPTION

Hereinafter, the exemplary embodiments will be described with reference to accompanying drawings in detail so that those skilled in the art can easily realize the embodiments.

Figure 1:
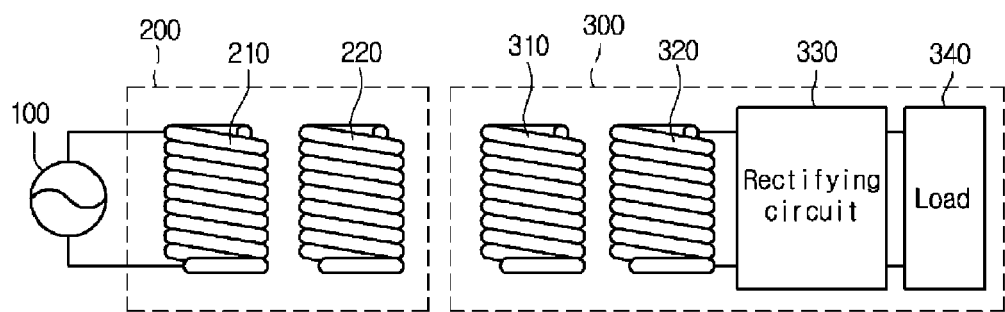
FIG. 1 is a view showing a wireless power transmission system according to one embodiment.

FIG. 1 a circuit diagram showing a resonance-type wireless power transmission system 1000 according to the embodiment.

Referring to FIG. 1, the wireless power transmission system may include a power source 100, a wireless power transmitter 200, and a wireless power receiver 300.

The wireless power transmitter 200 may include a transmission induction coil 210 and a transmission resonant coil 220.

The wireless power receiver 300 may include a reception resonant coil 310, a reception induction coil 320, and a rectifying circuit 330 and a load 340.

Both terminals of the power source 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying circuit 330, and the load 340 is connected to both terminals of the rectifying circuit 330. According to one embodiment, the load 340 may not be included in the wireless power receiver 300, and may be separately configured.

The power generated from the power source 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power source 100 may be an AC power source for supplying AC power having a predetermined frequency.

AC current flows through the transmission induction coil 210 by electric power provided from the power source 100. If the AC current flows through the transmission induction coil 210, the AC current is induced to the transmission resonant coil 220 physically spaced apart from the transmission induction coil 210 due to the electromagnetic induction. Thereafter, the power received in the transmission resonant coil 220 is transmitted to the wireless power receiver 300, which makes a resonance circuit with the wireless power transmitter 200, through resonance.

Power can be transmitted between two LC circuits, which are impedance-matched with each other, through resonance. The power transmitted through the resonance can be farther transmitted with higher efficiency when comparing with the power transmitted by the electromagnetic induction.

The reception resonant coil 310 receives power from the transmission resonant coil 220 through the resonance. The AC current flows through the reception resonant coil 310 due to the received power. The power received in the reception resonant coil 310 is transmitted to the reception induction coil 320, which is inductively coupled with the reception resonant coil 310, due to the electromagnetic induction. The power received in the reception induction coil 320 is rectified by the rectifying circuit 330 and transmitted to the load 340.

Figure 2:
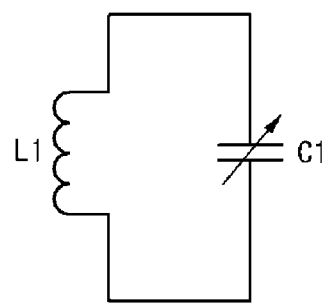
FIG. 2 is a circuit diagram showing an equivalent circuit diagram of a transmission induction coil according to one embodiment.

FIG. 2 is a circuit diagram showing an equivalent circuit of the transmission induction coil 210 according to the one embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected to the capacitor C1 in parallel.

The capacitor C1 may include a variable capacitor, and impedance matching may be performed by adjusting the capacitance of the capacitor C1. The equivalent circuits of the transmission resonant coil 220, the reception resonant coil 310 and the reception induction coil 320 may be the same as the equivalent circuit shown in FIG. 2.

Figure 3:
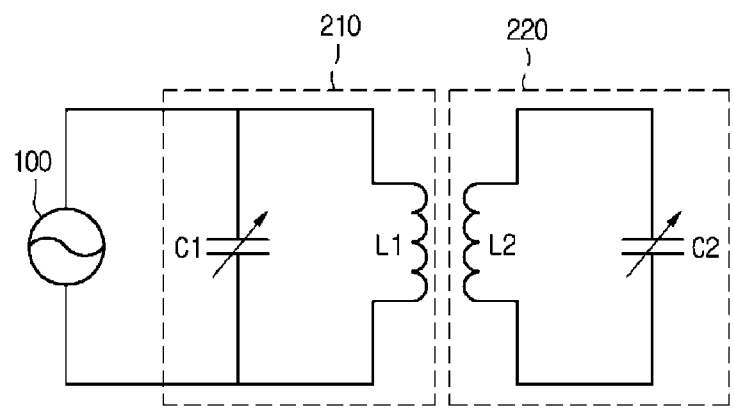
FIG. 3 is a circuit diagram showing an equivalent circuit of the power source and the wireless power transmitter according to one embodiment.

FIG. 3 is a circuit diagram showing an equivalent circuit of the power source 100 and the wireless power transmitter 200 according to one embodiment.

As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
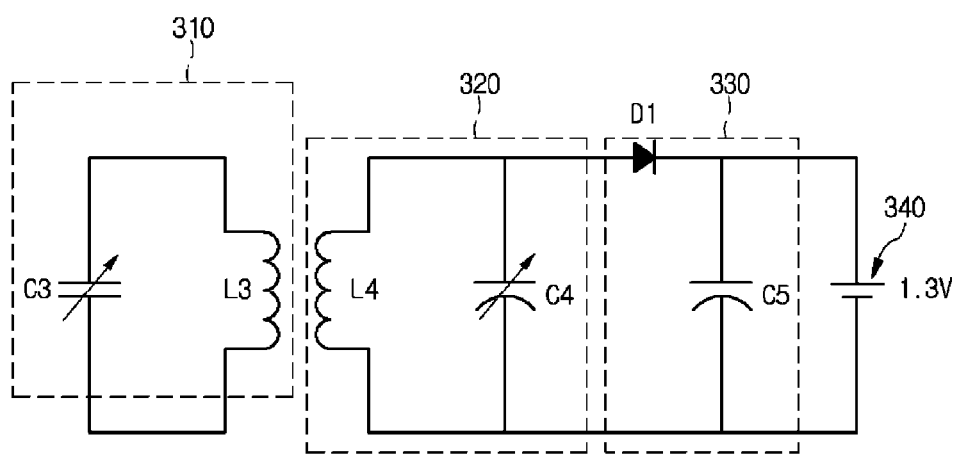
FIG. 4 is a circuit diagram showing an equivalent circuit of the wireless power receiver according to one embodiment.

FIG. 4 is a circuit diagram showing an equivalent circuit of the wireless power receiver 300 according to one embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying circuit 330 may include a diode D1 and a rectifying capacitor C5 and may output the DC power by converting the AC power into the DC power. In detail, the rectifying circuit 330 may include a rectifier and a smoothing circuit. The rectifier may include a silicon rectifier. The smoothing circuit can output smooth DC power.

Although the load 340 is denoted as a DC power source of 1.3V, the load 340 may be a predetermined rechargeable battery or a device requiring the DC power. However, the DC power source of 1.3V is only one example.

The configuration of the wireless power receiver 400 and the power transmission scheme of transferring power to the load 440 thereof according to the embodiment will be described with reference to FIGS. 5 to 7.

Figure 5:
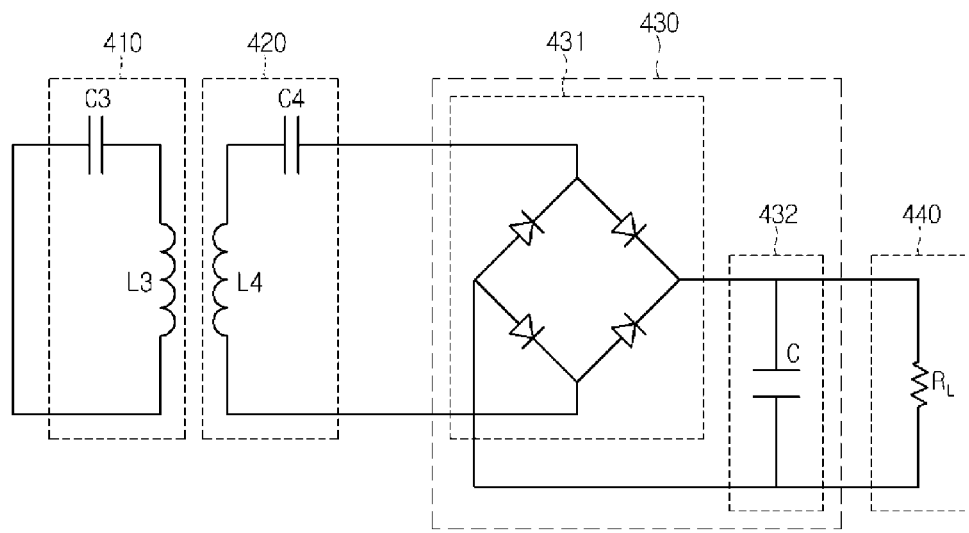
FIG. 5 is a circuit diagram showing a wireless power receiver according to one embodiment.

FIG. 5 is a circuit diagram showing the wireless power receiver 400 according to another embodiment.

Referring to FIG. 5, the wireless power receiver 400 may include a reception resonant coil 410, a reception induction coil 420, the rectifying unit 430, and a load 440.

In the embodiment, the load 440 may not be included in the wireless power receiver 400, but may be configured as a separate element. The load 440 may be an apparatus, such as a battery, into which power is charged, but the embodiment is not limited thereto.

The reception resonant coil 410 receives power from a transmitting side through resonance in a non-radiation scheme. The power received in the reception resonant coil 410 may include AC power.

The reception resonant coil 410 may include an inductor L3 having a predetermined inductance value and a capacitor C3 having a predetermined capacitance value. The inductor L3 may be connected in series to the capacitor C3.

The reception induction coil 420 may wirelessly receive power from the reception resonant coil 410 through electromagnetic induction.

The reception induction coil 420 may include an inductor L4 having a predetermined inductance value and a capacitor C4 having a predetermined capacitance value. The inductor L4 may be connected in series to the capacitor C4.

The rectifying unit 430 may convert the AC power received in the reception induction coil 420 into DC power.

The rectifying unit 430 may include a rectifier 431 and a smoothing circuit 432.

The rectifier 431 may include at least one diode. According to the embodiment, the diode may be a silicon diode, but the embodiment is not limited thereto.

According to one embodiment, although the rectifier 431 may perform a rectifying function by using one diode, the rectifier 431 may preferably include at least one diode. As shown in FIG. 5, the rectifier 431 may include bridge diodes. The diode bridge is a circuit structure in which four diodes are connected to each other to perform a rectifying function.

The rectifier 431 performs a rectifying function of converting received AC power into DC power. According to the embodiment, since the power is proportional to voltage or current, it is assumed that power, voltage, and current have the same concept for the convenience of explanation. The rectifying function refers to a function allowing current to flow only in one direction. In other words, the forward resistance of the rectifier 431 is low, and the reverse resistance of the rectifier 431 is sufficiently great, so that current may flow in one direction.

The smoothing circuit 432 may output the stable DC current by removing a ripple component from the DC output power of the rectifier 431.

The smoothing circuit 432 may include a capacitor for smoothing.

The current power output from the smoothing circuit 432 may be transferred to the load 440.

Figure 6:
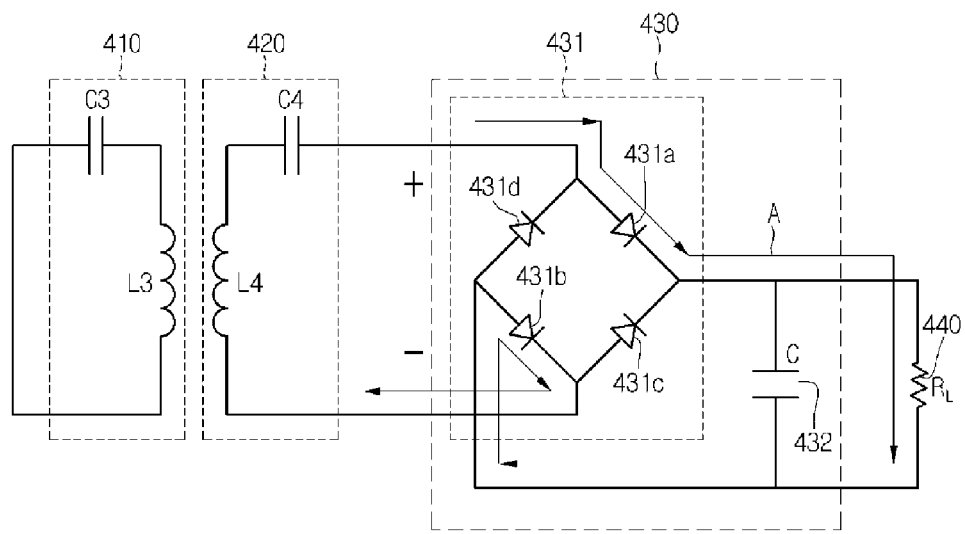
FIG. 6 is a circuit diagram illustrating a scheme through which a wireless power receiver according to the embodiment transfers power to the load when a positive AC current of a half-cycle duration is applied to the rectifying unit.

FIG. 6 is a circuit diagram illustrating a power transferring scheme of a wireless power receiver 400 according to the embodiment when a positive AC current of a half-cycle duration is applied to the rectifying unit 430.

Hereinafter, it is assumed in the following description that the AC current applied to the rectifying unit 430 has a sine waveform. The sine waveform is only one example.

As one example, the rectifier 431 is a diode bridge including a first rectifying diode 431a, a second rectifying diode 431b, a third rectifying diode 431c and a fourth rectifying diode 431d.

Referring to FIG. 6, line 'A', that indicates a direction in which current flows while the positive AC current corresponding to the half-cycle duration is applied to the rectifying unit 430, is depicted in FIG. 6.

If the positive AC current of the half-cycle duration is applied to the rectifying unit 430, such as the AC current direction line A, the AC current flows through the first rectifying diode 431a, the smoothing circuit 432, the load 440 and the second rectifying diode 431b.

If it is assumed that the voltage of 5V is applied to the rectifying unit 430 and the voltage of 0.7V is applied to each rectifying diode of the rectifier 431, since the voltage applied to the first and second rectifying diodes 431a and 431b is 1.4V, the voltage applied to the load 440 may be 3.6V.

Figure 7:
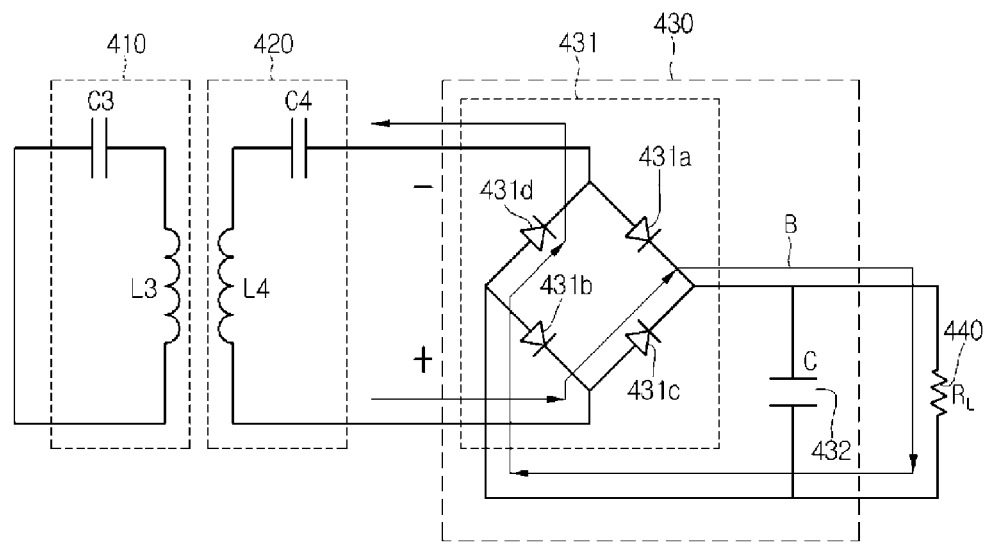
FIG. 7 is a circuit diagram illustrating a scheme through which a wireless power receiver according to the embodiment transfers power to the load when a negative AC current of a half-cycle duration is applied to the rectifying unit.

FIG. 7 is a circuit diagram illustrating a scheme through which a wireless power receiver 400 according to the embodiment transfers power to the load 440 when a negative AC current is applied to the rectifying unit 430.

If the negative AC current of the half-cycle duration is applied to the rectifying unit 430, such as the AC current direction line B, the AC current flows through the third rectifying diode 431c, the smoothing circuit 432, the load 440 and the fourth rectifying diode 431d.

If it is assumed that the voltage of 5V is applied to the rectifying unit 430 and the voltage of 0.7V is applied to each rectifying diode of the rectifier 431, since the voltage applied to the third and fourth rectifying diodes 431c and 431d is 1.4V, the voltage applied to the load 440 may be 3.6V.

Hereinafter, a power transferring scheme of a wireless power receiver 400 according to another embodiment will be described with reference to FIGS. 8 to 10.

Figure 8:
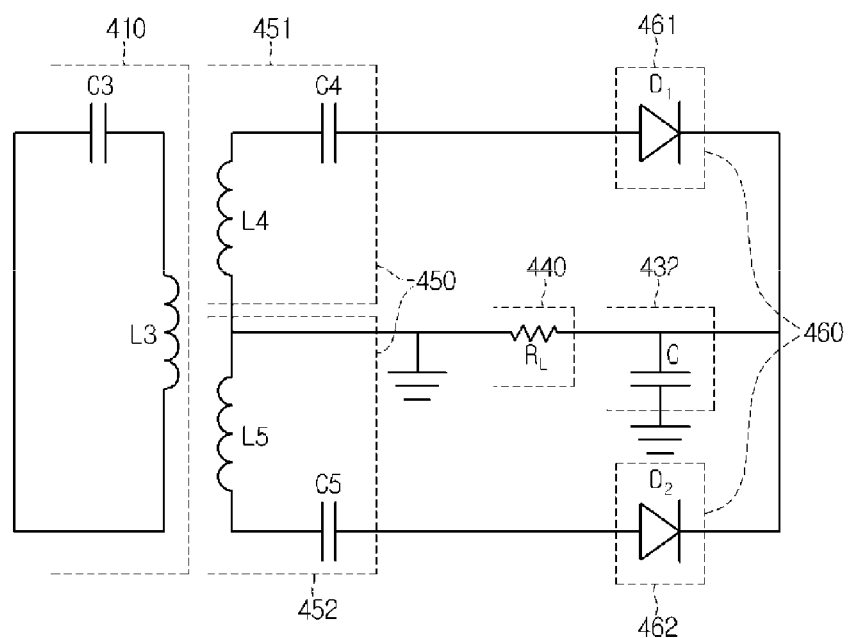
FIG. 8 is a circuit diagram showing a wireless power receiver according to another embodiment.

FIG. 8 is a circuit diagram showing a wireless power receiver 400 according to still another embodiment.

Referring to FIG. 8, the wireless power receiver 400 may include a reception resonant coil 410, a reception induction coil unit 450, the rectifying unit 460, and a load 440.

In the embodiment, the load 440 may not be included in the wireless power receiver 400, but may be configured as a separate element. The load 440 may be an apparatus, such as a battery, into which power is charged, but the embodiment is not limited thereto.

The reception resonant coil 410 may include an inductor L3 having a predetermined inductance value and a capacitor C3 having a predetermined capacitance value. The inductor L3 may be connected in series to the capacitor C3.

The reception induction coil unit 450 may include a first reception induction coil 451 and a second reception induction coil 452.

The first reception resonant coil 451 may include an inductor L4 having a predetermined inductance value and a capacitor C4 having a predetermined capacitance value. The inductor L4 may be connected in series to the capacitor C4.

The second reception resonant coil 452 may include an inductor L5 having a predetermined inductance value and a capacitor C5 having a predetermined capacitance value. The inductor L5 may be connected in series to the capacitor C5.

The rectifying unit 460 may include a first rectifying diode 461, a second rectifying diode 462 and a smoothing circuit 432.

The inductor L4 has one terminal connected to one terminal of the capacitor C4 and the opposite terminal connected to one terminal of the inductor L5.

The opposite terminal of the capacitor C4 may be connected to a first anode of the first rectifying diode 461.

The inductor L5 has one terminal connected to the opposite terminal of the inductor L4 and the opposite terminal connected to one terminal of the capacitor C5.

The opposite terminal of the capacitor C5 may be connected to a second anode of the second rectifying diode 452.

A first cathode of the first rectifying diode 461 may be connected to one terminal of a smoothing capacitor C and a second cathode of the second rectifying diode 462.

The one terminal of the smoothing capacitor C may be connected to one terminal of the load 440, the first cathode of the first rectifying diode 461 and the second cathode of the second rectifying diode 452, and the opposite terminal of the smoothing capacitor C may be grounded.

The opposite terminal of the load 440 may be connected to the opposite terminal of the inductor L4 and one terminal of the inductor L5.

The reception resonant coil 410 receives power from a transmitting side through resonance in a non-radiation scheme. The power received in the reception resonant coil 410 may include AC power.

The reception induction coil unit 450 may transfer the power received from the reception resonant coil 410 through electromagnetic induction to the rectifying unit 460.

The first and second reception induction coil 451 and 452 may receive the power from the reception resonant coil 410 through electromagnetic induction.

The rectifying unit 460 transfers the power received from the reception induction coil unit 450 to the load 440.

The first rectifying diode 461 may allow AC current to pass therethrough or may block the AC current according to a polarity of the AC current applied to the first reception induction coil 451. Due to property of a rectifying diode, the current flows in one direction according to the polarity of the AC power.

For example, when the polarity of the AC current applied is to the first rectifying diode 461 is positive, the first rectifying diode 461 allows the current to flow therethrough. In addition, when the polarity of the AC current applied to the first rectifying diode 461 is negative, the first rectifying diode 461 blocks the current. When the current is blocked due to a polarity change, the resistance value of the rectifying diode is increased so that the rectifying diode is operated as if a circuit is open.

Like the first rectifying diode 461, the second rectifying diode 462 allows AC current to flows through or be blocked according to the polarity of the AC current applied to the second reception induction coil 452.

The smoothing circuit 432 may output the stable DC current by removing a ripple component from the DC output power of the rectifying unit 460.

The smoothing circuit 432 may include the smoothing capacitor C.

The DC power outputted from the smoothing circuit 432 may be transferred to the load 440.

When compared with the power loss of the wireless power receiver 400 depicted in FIG. 5, the power loss of the wireless power receiver 400 depicted in FIG. 8 may be more reduced, which will be described below in detail.

Figure 9:
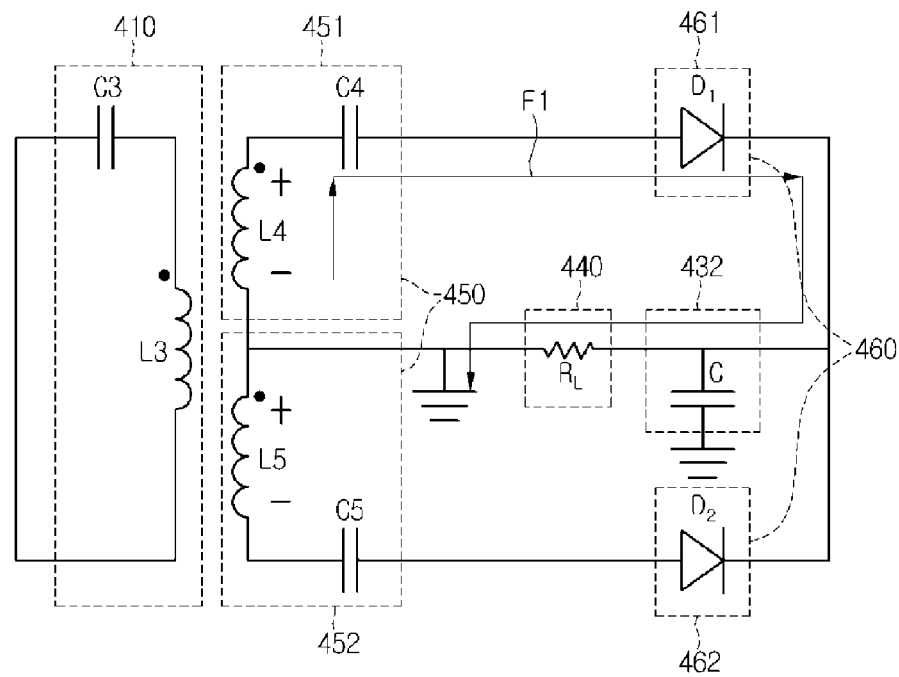
FIG. 9 is a circuit diagram illustrating a scheme through which a wireless power receiver according to another embodiment transfers power to the load when a positive AC current of a half-cycle duration is applied to the first and second reception induction coils.

FIG. 9 is a circuit diagram illustrating a scheme through which a wireless power receiver 400 according to another embodiment transfers power to the load 440 when a positive AC current of a half-cycle duration is applied to the first and second reception induction coils 451 and 452.

As shown in FIG. 9, dots are depicted at one terminal of the inductor L3 and one terminal of the inductor L4. The dots represent that the coils of the inductors L4 and L5 are wound in the same direction. That is, this signifies that voltages (currents) are applied to the inductors L4 and L5 in the same direction.

Hereinafter, it is assumed in the following description that the AC current applied to the first and second reception induction coils 451 and 452 has a sine waveform. The sine waveform is only one example.

Further, it is assumed that the applied voltage is 0.7 when the current flows through the first and second rectifying diodes 461 and 462. The voltage of 0.7V is only one example.

When a positive AC voltage of a half cycle is applied to both terminals of the inductor L4, the same positive AC voltage may be applied to both terminals of the inductor L5. Referring to FIG. 9, the positive AC voltage of the half cycle applied to both terminals of the inductor L4 and both terminals of the inductor L5 is marked with plus (+) and minus (−) signs.

In this case, the first rectifying diode 461 allows the positive AC current to pass therethrough during one half-cycle, but the second rectifying diode 462 prohibits the positive AC current from passing therethrough during the other half-cycle.

Referring to FIG. 9, a line F1 that represents a direction in which current flows while the positive AC current corresponding to a half cycle duration is applied to both terminals of the inductor L4 and both terminals of the inductor L5, is depicted. The current direction line F1 represents the direction in which the AC current flows in the wireless power receiver 400.

If the positive AC current of the half-cycle duration is applied to both terminals of the inductor L4 and both terminals of the inductor L5, such as the AC current direction line F1, the AC current flows through the inductor L4, the capacitor C4, the first rectifying diode 461, the smoothing capacitor C and the load 440.

The AC current may be applied to the second rectifying diode 462 in the forward bias direction so that the flowing of current may be blocked. That is, the second rectifying diode 462 is operated as an open circuit.

If it is assumed that the voltage of 5V may be applied to both terminals of each inductor L4 and L5, although 0.7V is applied to the first rectifying diode 461, a voltage is not applied to the second rectifying diode 462, so that the voltage applied to the load 440 may be 4.3V.

Different from the case of FIG. 6 where the current passes through the rectifying diode two times since a diode bridge is used as the rectifying unit 430, the wireless power receiver 400 according to the embodiment of FIG. 8 provides the power to the load 440 through only one rectifying diode, so that the transferred power may be increased.

The wireless power receiver 400 according to the embodiment shown in FIG. 9 may reduce the power loss by a half as compared with the power loss of the wireless power receiver 400 according to the embodiment shown in FIG. 6.

If the rectifying efficiency of the wireless power receiver according to the embodiment of FIG. 6 is about 90%, the rectifying efficiency of the wireless power receiver according to the embodiment of FIG. 9 is about 95%. That is, the power loss may be reduced from 10% to 5%. The rectifying efficiency may signify the ratio of the power applied from the reception induction coil to the rectifying circuit to the power transferred to the load 440.

Although the wireless power receiver according to the embodiment of FIG. 6 uses four rectifying diodes, the wireless power receiver according to the embodiment of FIG. 9 uses two rectifying diodes so that the cost may be reduced and the size of the entire circuit may be reduced.

Figure 10:
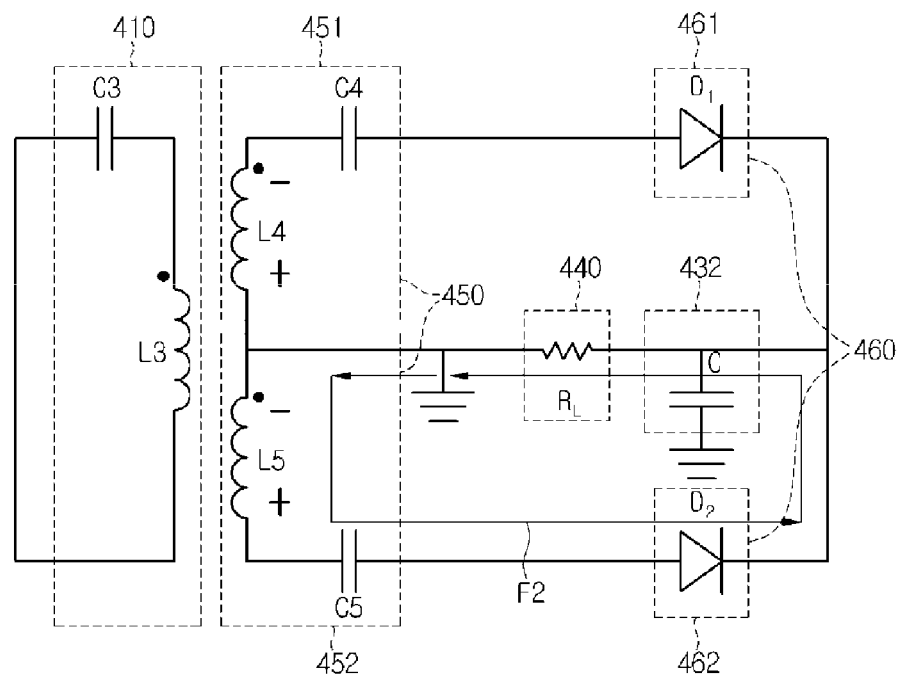
FIG. 10 is a circuit diagram illustrating a scheme through which a wireless power receiver according to another embodiment transfers power to the load when a negative AC current of a half-cycle duration is applied to the first and second reception induction coils.

FIG. 10 is a circuit diagram illustrating a power transferring scheme of a wireless power receiver 400 according to another embodiment when a negative AC current of a half-cycle duration is applied to the first and second reception induction coils 451 and 452.

Referring to FIG. 10, a line F2 that represents a direction in which current flows while the negative AC current corresponding to a half cycle duration is applied to both terminals of the inductor L4 and both terminals of the inductor L5, is depicted. The current direction line F2 represents the direction in which the AC current flows in the wireless power receiver 400.

If the negative AC current of the half-cycle duration is applied to both terminals of the inductor L4 and both terminals of the inductor L5, such as the AC current direction line F2, the AC current flows through the inductor L4, the capacitor C4, the first rectifying diode 461, the smoothing capacitor C and the load 440.

The negative AC current may be applied to the second rectifying diode 462 in the forward bias direction so that the flowing of current may be blocked. That is, the first rectifying diode 461 is operated as an open circuit.

If it is assumed that the voltage of 5V may be applied to both terminals of each inductor L4 and L5, although 0.7V is applied to the second rectifying diode 462, a voltage is not applied to the first rectifying diode 461, so that the voltage applied to the load 440 may be 4.3V.

Thus, even if the negative AC current is applied to the first and second reception induction coils 451 and 452, the efficiency described in FIG. 9 may be obtained.

Figure 11:
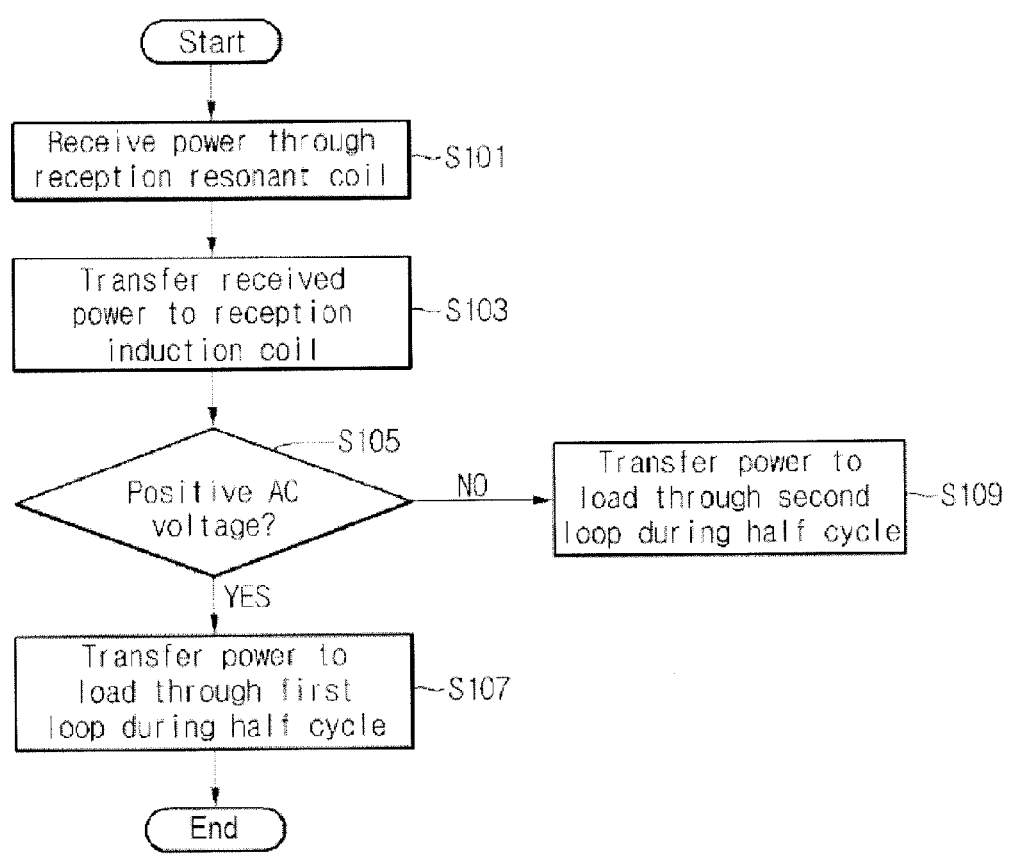
FIG. 11 is a flowchart showing a wireless power transmitting method of a wireless power receiver according to one embodiment.

FIG. 11 is a flowchart showing a wireless power transmitting method of a wireless power receiver according to one embodiment.

The configuration of the wireless power receiver 400 is the same as that depicted in FIG. 8.

First, in step S101, the reception resonant coil 410 receives power from the wireless power transmitter 200 by using resonance. The received power may be in a type of an AC power.

Then, in step S103, the reception induction coil unit 450 receives the AC power from the reception resonant coil 420 through electromagnetic induction. In the embodiment, the received power may be in a type of an AC power.

If the received power is a positive AC voltage in step S105. The wireless power receiver 400 transfers the power to the load through a first loop during one half-cycle in step S107. In the embodiment, the first loop may signify a loop having a configuration in which the inductor L4, the capacitor C4, the first rectifying diode 461 and the load 440 are connected to each other along the AC current direction line F1 depicted in FIG. 9.

If the received power is a negative AC voltage in step S105. The wireless power receiver 400 transfers the power to the load 440 through a second loop during the other half-cycle in step S109. In the embodiment, the second loop may signify a loop having a configuration in which the inductor L5, the capacitor C5, the second rectifying diode 462, the smoothing capacitor C and the load 440 are connected to each other along the AC current direction line F2 depicted in FIG. 10.

Different from the case of FIG. 6 where the current passes through the rectifying diode two times since a diode bridge of the rectifying unit 430 is used as the rectifying unit 430, the wireless power receiver 400 provides the power to the load 440 through only one rectifying diode, so that the transferred power may be increased. That is, the diode voltage drop occurs once, so that the power loss caused while the AC power is converted into the DC power is reduced, so the rectifying efficiency may be improved.

Further, the wireless power transferring scheme of the wireless power receiver 400 uses two rectifying diodes so that the cost may be reduced and a size of the entire circuit may be reduced.

The wireless power receiver 400 may be mounted on a mobile terminal such as a portable phone, smart phone, a laptop computer, a digital broadcasting terminal, a PDA (Personal Digital Assistants), a PMP (Portable Multimedia Player), or a navigation terminal.

In addition, it shall be easily understood by those skilled in the art that the configuration according to the embodiment described in the disclosure may be applicable to a fixed terminal such as a digital TV or a desktop computer as well as a mobile terminal.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power receiver to receive power wirelessly from a wireless power transmitter, the wireless power receiver comprising:
   a first reception coil coupled with a resonant coil to receive a positive AC power from the resonant coil;
   a first capacitor connected in series to the first reception coil;
   a first rectifying diode configured to rectify the positive AC power received through the first capacitor;
   a second reception coil connected to the first reception coil and coupled with the resonant coil to receive a negative AC power from the resonant coil;
   a second capacitor connected in series to the second reception coil;
   a second rectifying diode configured to rectify the negative AC power received through the second capacitor; and
   a smoothing capacitor connected directly to both the first rectifying diode and the second rectifying diode;
   wherein the wireless power receiver changes a transferring path of the power provided to a load according to a polarity variation of the AC power received through the first and second reception coils, and
   wherein the smoothing capacitor includes a first terminal connected directly to a ground terminal and a second terminal connected directly to the load.

2. The wireless power receiver of claim 1, wherein either the first rectifying diode or the second rectifying diode rectifies the AC power according to the polarity variation of the AC power.

3. The wireless power receiver of claim 2, wherein the first rectifying diode is turned on to transfer the power to the load when a polarity of the AC power is positive, and the second rectifying diode is turned on to transfer the power to the load when the polarity of the AC power is negative.

4. The wireless power receiver of claim 3, wherein the wireless power receiver transfers the power to the load through a first loop and a second loop,
wherein the first loop is a power transferring path extending through the first reception coil, the first rectifying diode and the load, and
the second loop is a power transferring path extending through the second reception coil, the second rectifying diode and the load.

5. The wireless power receiver of claim 4, wherein one terminal of the first reception coil is connected to one terminal of the second reception coil.

6. The wireless power receiver of claim 5, wherein the first and second reception coils are wound in a same direction.

7. The wireless power receiver of claim 6, wherein the first rectifying diode includes a first anode connected to the first capacitor, which is connected to an opposite terminal of the first reception coil, and a first cathode connected to the one terminal of the load,
wherein the second rectifying diode includes a second cathode connected to the first cathode and a second anode connected to the second capacitor, which is connected to an opposite terminal of the second reception coil,
wherein the one terminal of the first reception coil and the one terminal of the second reception coil are connected to an opposite terminal of the load, and
wherein the opposite terminal of the load is grounded.

8. The wireless power receiver of claim 1, wherein the load is a rechargeable battery.

9. The wireless power receiver of claim 1, wherein the load is a DC power source of 1.3 V.

10. The wireless power receiver of claim 1, wherein the first rectifying diode includes a first anode connected to the first capacitor and a first cathode connected to a first terminal of the load,
wherein the second rectifying diode includes a second cathode connected to the first cathode and a second anode connected to the second capacitor,
wherein a first terminal of the first reception coil is connected to both a first terminal of the second reception coil and a second terminal of the load opposite to the first terminal of the load, and
wherein the second terminal of the load is grounded.

11. The wireless power receiver of claim 10, wherein the first capacitor is connected to a second terminal of the first reception coil opposite to the first terminal of the first reception coil, and
wherein the second capacitor is connected to a second terminal of the second reception coil opposite to the first terminal of the second reception coil.

* * * * *